(12) United States Patent
Ciabaszewski

(10) Patent No.: US 8,245,996 B1
(45) Date of Patent: Aug. 21, 2012

(54) TAG PLATE POSITIONING BRACKET

(76) Inventor: Derek R. Ciabaszewski, Putnam, CT (US)

( * ) Notice: Subject to any disclaimer, the term of this patent is extended or adjusted under 35 U.S.C. 154(b) by 813 days.

(21) Appl. No.: 12/315,604

(22) Filed: Dec. 4, 2008

(51) Int. Cl.
*F16M 13/00* (2006.01)

(52) U.S. Cl. .............. 248/550; 248/286.1; 280/288.4; 280/765.1; 40/211

(58) Field of Classification Search .......... 248/550, 248/480, 201, 286.1, 285.1; 280/288.4, 292, 280/491.1, 491.2, 765.1; 40/200, 209, 211, 40/643, 492
See application file for complete search history.

(56) References Cited

U.S. PATENT DOCUMENTS

| | | | |
|---|---|---|---|
| 2,704,963 A * | 3/1955 | Parachek | 248/480 |
| 4,558,930 A * | 12/1985 | Deedreek | 359/841 |
| 5,678,872 A | 10/1997 | Slater | |
| 5,993,133 A | 11/1999 | Murray et al. | |
| 6,290,247 B1 * | 9/2001 | Schafer et al. | 280/292 |
| 6,511,090 B2 | 1/2003 | Quanbeck et al. | |
| 6,796,060 B1 | 9/2004 | Meester et al. | |
| 6,974,146 B2 * | 12/2005 | Abair | 280/470 |
| 7,159,526 B2 | 1/2007 | Derochers | |
| 7,219,911 B2 | 5/2007 | Sukonthapanich et al. | |
| 7,818,905 B1 * | 10/2010 | Stahel et al. | 40/492 |

* cited by examiner

*Primary Examiner* — Bradley Duckworth
(74) *Attorney, Agent, or Firm* — Montgomery Patent & Design, LLC; Robert C. Montgomery; Joseph T. Yaksich

(57) ABSTRACT

A retractable license plate bracket for a motor vehicle is herein disclosed, comprising a means for a license plate to fold down under the motor vehicle. In this manner, sport cars, show cars, cars with low ground clearance and similar motor vehicles can display license plates for motoring purposes on the road, yet allow the license plate to essentially disappear when at shows or for aesthetic purposes.

11 Claims, 6 Drawing Sheets

TAG PLATE POSITIONING BRACKET

RELATED APPLICATIONS

The present invention was first described in a notarized Official Record of Invention on Jun. 7, 2007, that is on file at the offices of Montgomery Patent and Design, LLC, the entire disclosures of which are incorporated herein by reference.

FIELD OF THE INVENTION

The present invention relates generally to a tag plate positioning bracket and, more particularly, to said bracket comprising a retractable mechanism which discreetly positions a front-mounted license tag under a motor vehicle when not being driven.

BACKGROUND OF THE INVENTION

The love affair people have with their automobiles is a well-known fact. Countless hours are spent cleaning, waxing, and detailing cars all around the world every day, just so they can look their best as they drive down the road. Many people also go to extra lengths to draw attention to their car. This is evidenced by the great popularity of custom paint schemes, custom wheels, and even special neon lights. However, one (1) item that is the same on every car from the cheapest junker to the most exotic sports car is that of the license plate. As such, many people do not want to draw attention to such plates and will go out of their way to remove them while at shows or gatherings. This tactic however requires time when removing the plates and then replacing them to drive back home. Additionally, many cars must add holes and bushings to allow the plate to be attached to vehicles which is not in line with its styling. Accordingly, there exists a need for a means by which a license plate display on specialty vehicles can be addressed without the disadvantages as described above. The development of the apparatus herein fulfills this need.

The present invention is a retractable license plate bracket for motor vehicles. The retractable license plate bracket presents a license plate on a motor vehicle in the customary manner albeit close to the ground and provides the ability for the license plate to fold up under the vehicle when the vehicle is parked or being displayed. Many areas require license plates to be displayed on the front and the back end of a vehicle; additionally, this may require unsightly holes and fasteners that many vehicle owners do not want on their vehicles. The retractable license plate bracket comprises a plurality of slide assemblies, electrically-operated mechanical components, and a license mounting plate which are mounted to the undercarriage of a vehicle. In this manner, sport cars, show cars, cars with low ground clearance and the like, can be provided with license tags for motoring purposes on the road, yet allow the license tag to essentially disappear when at shows or for aesthetic purposes. The use of the present apparatus provides a simple and effective solution to the necessary requirement of motor vehicle license plates on specialty vehicles in unique and novel way manner.

Several attempts have been made in the past to provide attachments for vehicle accessories. U.S. Pat. No. 5,678,872, issued in the name of Slater, discloses a concealable vehicle bumper step comprising a bumper with a concealable step, a fascia side, and an under vehicle storage area. The Slater bumper step provides a releasably attached step located subjacent to an automobile bumper which can be concealed from view within a storage area when not in use. However, unlike the present invention, the Slater concealable bumper step does not provide a means for displaying or concealing required license plate tags.

U.S. Pat. No. 5,993,133, issued in the name of Murray et al., discloses a retractable spare tire carrier designed to carry a spare tire under a vehicle. The Murray spare tire carrier comprises a tire assembly mounting plate and a cantilevered arm which is mounted to the underside of the vehicle frame. However, unlike the present invention, the Murray retractable spare tire carrier is manually manipulated and is for use with spare tire storage and concealment.

U.S. Pat. No. 6,511,090, issued in the name of Quanbeck et al., discloses a retractable hitch which is mounted to the rear end of a towing vehicle. The Quanbeck hitch comprises a hitch which is slidably mounted with a housing attached to a towing vehicle. The hitch extends out from the vehicle in a working position and retracts into the housing in a stowed position. However, unlike the present invention, the Quanbeck retractable hitch is simply a single axis, manually engaged slide mechanism for trailer hitches.

U.S. Pat. No. 6,796,060, issued in the name of Meester et al., discloses a vehicle license plate holder assembly with roadside assistance request mechanism. The Meester license plate holder assembly comprises a vehicle mounting housing with an emergency signal light and a pivoting license plate bracket. The license plate bracket temporarily lowers about a pivoting arm revealing the emergency signal. However, unlike the present invention, the Meester vehicle license plate holder assembly with roadside assistance request mechanism does not enable the concealment of a license plate tag though a mechanical retracting mechanism and requires additional mounting to the exterior of the vehicle.

U.S. Pat. No. 7,159,526, issued in the name of Derochers, discloses a retractable boat bumper system and method comprising a bumper plate and positioning mechanism. The Derochers boat bumper system provides a two (2) position extendable boat bumper which protects a boat from possible damage when docked. However, unlike the present invention, the Derochers retractable boat bumper system does not provide a mechanically activated system to conceal the bumper.

The prior art appears to disclose various retractable vehicle accessories. However, none of the prior art particularly describes a tag plate positioning bracket which comprises a license plate bracket mounting mechanism which provides a means of retraction and concealment when the vehicle is not being driven. Accordingly, there exists a need for a means by which the requirement of license tag display can be provided while minimizing the vehicle exterior alteration or appearance without the disadvantages as described above.

SUMMARY OF THE INVENTION

In view of the foregoing disadvantages inherent in the prior art, it has been observed that there is need for a retractable license plate positioning bracket providing a means of discreetly concealing a license tag underneath a vehicle when not being driven.

To achieve the above objectives, it is an object of the present invention have a tag plate positioning bracket for motor vehicles comprising a pivot plate which provides a mounting surface for an ordinary license plate with a plurality of mounting holes, an electric cylinder assembly which provides powered linear horizontal motion to the pivot plate, and a cylinder shaft which provides horizontal motion to project and retract the pivot plate.

A further object of the present invention is to have a tag plate positioning bracket which is attached to the undercarriage of a motor vehicle and provides a retractable mechanism which enables the license plate to move to a fully deployed and a horizontal state.

Yet still another object of the present invention is to have a cylinder shaft comprising a cylinder connecting rod, a first slide rod, a second slide rod, a first pivot plate bracket and a second pivot plate bracket.

Yet still another object of the present invention is to have a cylinder connecting rod comprising a first end and an opposing second end which is slidingly attached to the cylinder shaft and extends horizontally and perpendicularly from the cylinder shaft.

Yet still another object of the present invention is to have a first end of the cylinder connection rod attaching to the first slide rod and an opposing second end of the cylinder connection rod attaching to the second slide rod which enables the cylinder connection rod to transmit the linear motion of the cylinder shaft to the first and the second slide rods.

Yet still another object of the present invention is to have the cylinder shaft, the first slide rod, and the second slide rod move as a single unit.

Yet still another object of the present invention is to have a first slide rod which provides a rotating means of attachment to the first pivot plate and a second slide rod which provides a rotating means of attachment to the second pivot plate.

Yet still another object of the present invention is to have a pivot plate rod located between the first pivot plate bracket and the second pivot plate bracket which provides a means of anchoring a first torsion spring and a second torsion spring between the first pivot plate bracket and the second pivot plate bracket.

Yet still another object of the present invention is to have a first and a second torsion spring which provide a means of downward force to a rear surface of the pivot plate thereby stabilizing the pivot plate during normal motoring, projection, and retraction.

Yet still another object of the present invention is to have a first and a second pivot plate bracket which provide a means of rotation of the pivot plate in relation to the first slide rod and second slide rod during the tilting motion of the pivot plate during the transition from the horizontal state to the fully deployed state.

Yet still another object of the present invention is to have a first slide assembly located parallel to the electric cylinder assembly on a first side and a second slide assembly located parallel to the electric cylinder assembly on an opposing second side.

Yet still another object of the present invention is to have a tilt rod which provides a secondary tilting motion to the pivot plate thereby positioning and displaying the license plate.

Yet still another object of the present invention is to have a tilt rod bushing which provides a means of slidingly receiving and guiding the tilt rod during deployment of the tag plate positioning bracket.

Yet still another object of the present invention is to have an electric control system which provides a means of automatic control of the projection and retraction of the tag plate positioning bracket to a user by the use of a motor switch.

Yet still another object of the present invention is to have a first and a second slide assembly which provide two (2) to four (4) progressive sliding sections thereby creating a compact length when the tag plate positioning bracket is in a retracted state.

Yet still another object of the present invention is to have a pivot plate which can be moved to a fully deployed state where the license plate is displayed in a normal manner and to a horizontal state where the license plate is folded under the undercarriage of a motor vehicle.

Yet still another object of the present invention is to have an electric cylinder assembly which provides an electric means of retracting and concealing the pivot plate along the undercarriage of a motor vehicle and comprises a cylinder housing, a direct current (DC) cylinder motor, an integral gear reducer, a first rear cylinder mounting bracket, a second rear cylinder mounting bracket, a first front cylinder mounting bracket, and a second front cylinder mounting bracket.

Yet still another object of the present invention is to have a first rear cylinder mounting bracket which is connected to an edge of the DC motor and a second rear cylinder mounting bracket which is connected to an opposing edge of the DC motor which provide a means of attaching the electric cylinder assembly to the undercarriage of a motor vehicle.

Yet still another object of the present invention is to have a first front cylinder mounting bracket which is connected to an edge of the cylinder housing and a second front cylinder mounting bracket which is connected to an opposite edge of the cylinder housing which provide a means for attaching the electric cylinder assembly to the undercarriage of a motor vehicle.

Yet still another object of the present invention is to have a first slide assembly further comprising a first slide housing which provides a protective sealed metal enclosure to the internal components of the first slide assembly, a first end first slide mounting bracket which is located at a first end of the first slide housing and a second first slide mounting bracket located on an opposing second end of the first slide housing which provide a means for attaching the first slide assembly to the undercarriage of a motor vehicle, and a first slide rod which is operably connected to the first slide housing which comprises a forward extending member of the first slide assembly and which provides a means of attachment to the pivot plate at a front end portion, wherein the first slide assembly provides the progressive sliding sections, thereby creating the compact length when the tag plate positioning bracket is in the retracted state.

Yet still another object of the present invention is to have a second slide assembly comprising a second slide housing which provides a protective sealed metal enclosure thereto internal components of said second slide assembly, a first second slide mounting bracket which is located at a first end of the second slide housing and a second end second slide mounting bracket which is located on a second end of the second slide housing which provides a means for attaching the second slide assembly to the undercarriage of a motor vehicle, and said second slide rod which is operably connected to the second slide housing which comprises a forward extending member of the second slide assembly and provides a means of attachment to the pivot plate at a front end portion, wherein the second slide assembly provides a means of threaded attachment to the tilt rod bushing affixed along an inner vertical surface, wherein the second slide assembly provides the progressive sliding sections thereby creating the compact length when the tag plate positioning brackets is in the retracted state.

Yet still another object of the present invention is to have a tilt rod comprising a rounded metal one (1) to two (2) feet long having a threaded region along a rear portion and providing a threaded means of attachment to a tilt rod stop block.

Yet still another object of the present invention is to have a tilt rod stop block comprising a mechanical stop device to the tilt rod, a front portion of the tilt rod which attaches to the pivot plate; a tilt rod joint that provides a means of rotational attachment of the tilt rod to the pivot plate.

Yet still another object of the present invention is to have a tilt rod shaft and a tilt rod bracket that work in conjunction with the tilt rod joint forming a horizontal axle-type assembly, wherein upon extension of the tag plate positioning bracket the tilt rod extends in a forward direction until the tilt rod stop block contacts with the tilt rod bushing, thereby halting movement of the tilt rod.

Yet still another object of the present invention is to have a tilt rod bushing comprising a ball-joint device having an internal bronze or brass bushing.

Yet still another object of the present invention is to have a cylinder connecting rod which is secured to the cylinder shaft by a first clamp collar and a second clamp collar, thereby maintaining the relative position of the cylinder connecting rod to the cylinder shaft.

Yet still another object of the present invention is to have an electrical control system comprising a first position sensor located on the electric cylinder assembly thereby providing a first input signal to the control box assembly and a second position sensor located on the electric cylinder assembly thereby providing a second input signal to the control box assembly in which the control box assembly in electrical communication with the first position sensor and said second position sensor through a control cable wherein the first position sensor and the second position sensor detect and relay the position of the tag plate positioning bracket and wherein the electrical control system provides a means of automatic control of projection and retraction functions of the tag plate positioning bracket to a user.

Yet still another object of the present invention is to have a control box assembly comprising a housing which provides a means of protection to the internal components of the control box assembly, a plurality of mounting brackets which are located along each lower corner portion of the housing thereby providing a means of mounting to a suitable interior surface of a motor vehicle, a motor switch which provides a contact means to initiate retraction and projection functions of the apparatus, an on/off switch which provides current to the apparatus, and a first visual indicator light and a second visual indicator light each of which are located adjacent to the motor switch thereby providing indication to the user when the tag plate positioning bracket is in the extended or the retracted position; wherein the control box assembly is located within a passenger compartment of a motor vehicle.

Yet still another object of the present invention is to have a tilt rod bushing comprising a ball-joint device having an internal bronze or brass bushing.

Yet still another object of the present invention is to have a tag plate positioning bracket which may be configured using the appropriate means to fit a variety of different vehicle types such as sport cars, show cars, new cars, vintage cars, and trucks in a manner providing equal benefit.

Yet still another object of the present invention is to provide a method for utilizing a tag plate positioning bracket on motor vehicles.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
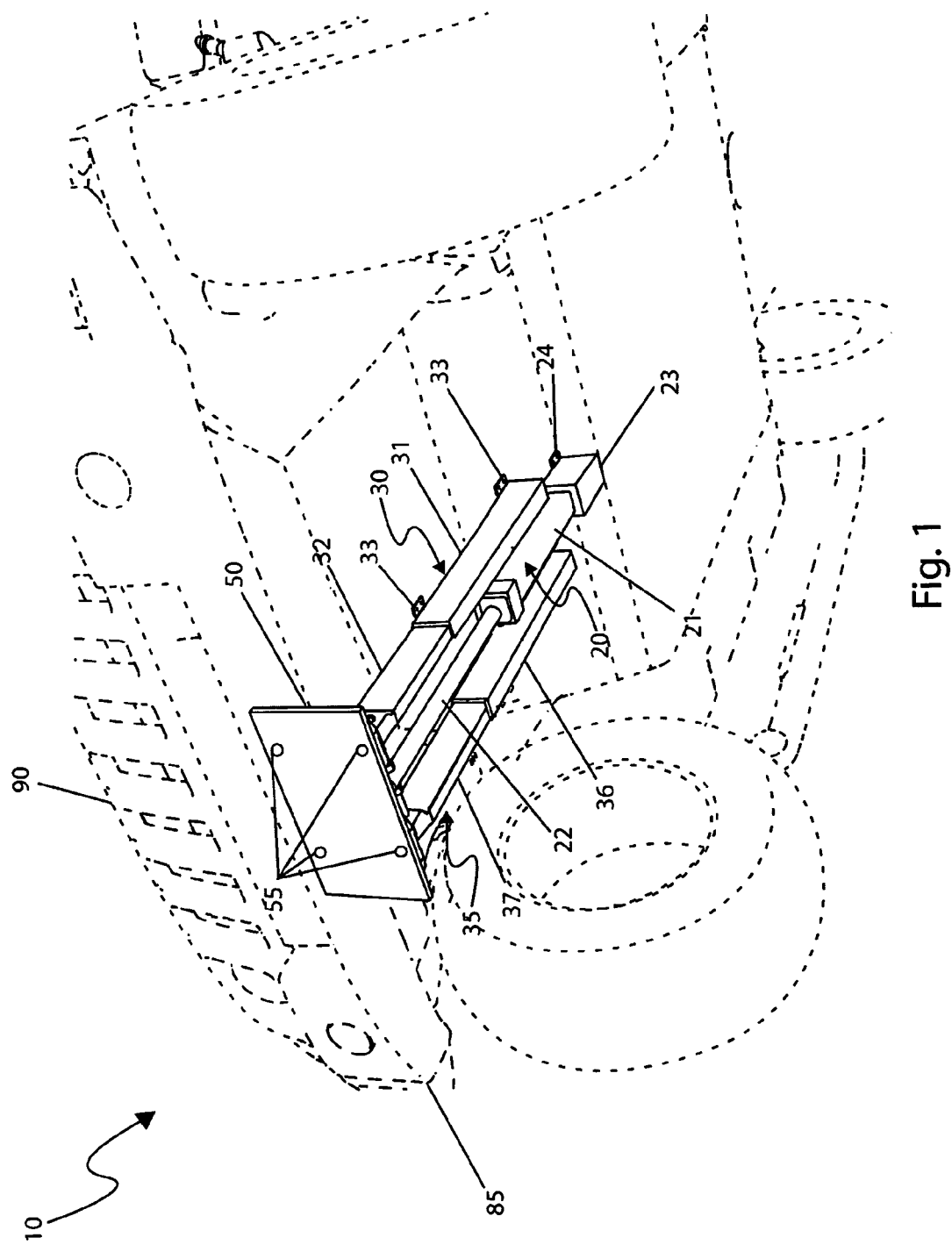
FIG. 1 is an environmental view of a tag plate positioning bracket 10 depicting a deployed state, according to a preferred embodiment of the present invention.

| DESCRIPTIVE KEY | |
|---|---|
| 10 | tag plate positioning bracket |
| 20 | electric cylinder assembly |
| 21 | cylinder housing |
| 22 | cylinder shaft |
| 23 | cylinder motor |
| 24 | rear cylinder mounting bracket |
| 25 | cylinder connecting rod |
| 26 | front cylinder mounting bracket |
| 27 | clamp collar |
| 28 | position sensor |
| 30 | first slide assembly |
| 31 | first slide housing |
| 32 | first slide rod |
| 33 | first slide mounting bracket |
| 35 | second slide assembly |
| 36 | second slide housing |
| 37 | second slide rod |
| 38 | second slide mounting bracket |
| 40 | tilt rod |
| 41 | tilt rod stop block |
| 42 | tilt rod bushing |
| 43 | tilt rod joint |
| 44 | tilt rod bracket |
| 45 | tilt rod shaft |
| 50 | pivot plate |
| 51 | pivot plate bracket |
| 52 | pivot plate rod |
| 53 | torsion spring |
| 54 | snap ring |
| 55 | plate mounting holes |
| 60 | fastener |
| 61 | primary motion |
| 62 | secondary motion |
| 70 | control box assembly |
| 71 | control cable |
| 72 | control box housing |
| 73 | mounting bracket |
| 74 | ON/OFF switch |
| 75 | motor switch |
| 76 | indicator light |
| 77 | control circuit board |
| 78 | relay board |
| 80 | license plate |
| 85 | bumper |
| 90 | vehicle |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a tag plate positioning bracket (herein described as the "apparatus") 10, which comprises a retractable mechanism 20 to discretely conceal a front vehicle license plate 80. The apparatus 10 provides a means for a license plate 80 to fold down under the vehicle 90. In this manner, sport cars, show cars, cars with low ground clearance, and similar vehicles, can display license plates 80 in a normal manner during motoring, yet allow the license plate 80 to essentially disappear when at shows or for aesthetic purposes.

Referring now to FIG. 1, an environmental view of the apparatus 10 depicting a deployed state, according to the preferred embodiment of the present invention, is disclosed. The apparatus 10 comprises an electric cylinder assembly 20, a first slide assembly 30, a second slide assembly 35, and a pivot plate 50. The apparatus 10 comprises electrically-operated low-profile mechanical components mounted thereto an undercarriage of a motor vehicle 90 being subjacent thereto the front bumper 85 and radiator area of the vehicle 90. The apparatus 10 provides both linear 61 and tilting motions 62 thereto an affixed license plate 80 allowing discrete concealment of said license plate 80 under the vehicle 90 when desired.

The pivot plate 50 provides a mounting surface thereto a standard license plate 80. The pivot plate 50 comprises a flat rectangular plate approximately one-quarter (¼) inch thick having outer dimensions which correspond generally thereto a standard license plate 80. The pivot plate 50 comprises four (4) license plate mounting holes 55 in an expected manner being similar in appearance thereto original-equipment license plate mounting surfaces found on many vehicles 90.

The apparatus 10 is illustrated here being applied thereto a sport utility vehicle 90; however, it is understood that the apparatus 10 may be configured using appropriate bracketry and fasteners to fit a variety of vehicle types 90 such as sport cars, show cars, new cars, vintage cars, trucks, and the like, providing equal benefit thereto.

Figure 2:
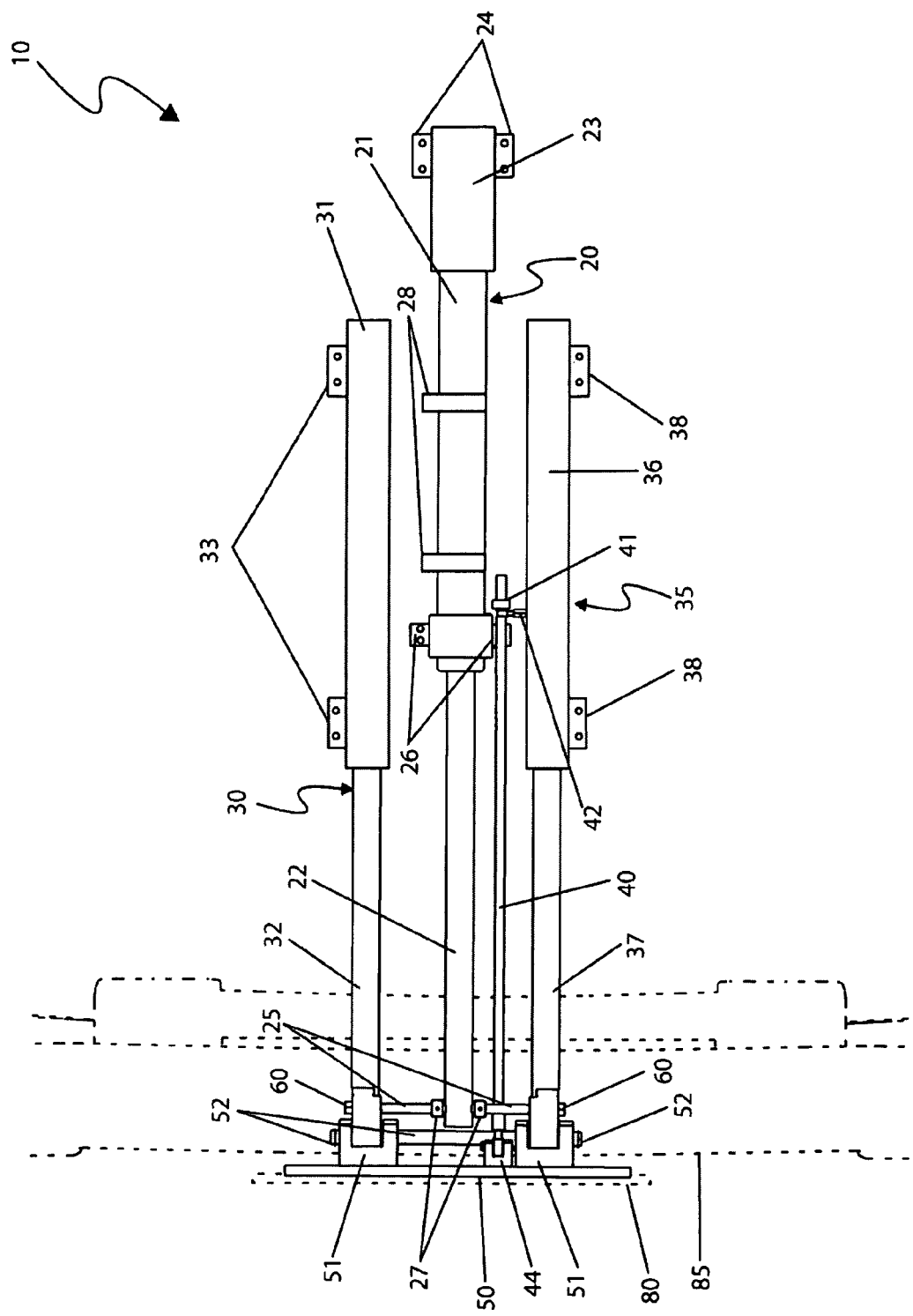
FIG. 2 is a bottom view of a tag plate positioning bracket 10, according to a preferred embodiment of the present invention.

Referring now to FIG. 2, a bottom view of the apparatus 10, according to the preferred embodiment of the present invention, is disclosed. The apparatus 10 comprises an electric cylinder assembly 20, a first slide assembly 30, a second slide assembly 35, a tilt rod bushing 42, a tilt rod 40, and a pivot plate 50.

The electric cylinder assembly 20 provides a powered primary horizontal motion 61 thereto a pivot plate 50 and an affixed license plate 80 in a linear horizontal direction, thereby projecting and retracting the pivot plate 50 therealong the undercarriage of the vehicle 90. The electric cylinder assembly 20 also provides a retracting and concealing means thereto said license plate 80 relocating the license plate 80 to a position under the vehicle 90 being out of normal view. The electric cylinder assembly 20 is envisioned to be a commercially available linear motion unit common in the industry. The electric cylinder assembly 20 comprises expected features and components such as an integral gear reducer, common electrical connectors, a protective cylinder housing 21, a cylinder shaft 22, a 12-volt DC cylinder motor 23, a pair of rear cylinder mounting brackets 24, and a pair of front cylinder mounting brackets 26. The electric cylinder assembly 20 is further envisioned being made using corrosion-resistant metal components using materials such as plated steel, anodized aluminum, or the like. The cylinder housing 21 comprises a protective sealed metal enclosure thereto internal components of the electric cylinder assembly 20 providing protection from highway elements such as dust, dirt, water, and the like. The cylinder shaft 22 comprises a rugged round shaft comprising a stroke of approximately eight (8) to sixteen (16) inches and is envisioned being made using chrome plated hardened steel or equivalent durable materials. The cylinder motor 23 comprises a heavy-duty 12-volt DC unit suitable for outdoor automotive applications being able to withstand regional temperature gradients and expected highway elements. Furthermore, the cylinder motor 23 comprises a DC variable speed capability. The electric cylinder assembly 20 provides an attachment means thereto the vehicle 90 via a plurality of mounting brackets 24, 26 being affixed thereto the electric cylinder assembly 20 along front and rear side portions in a conventional manner. The cylinder mounting brackets 24, 26 comprise common right angle-shaped members comprising a variety of sizes and hole configurations allowing mounting of the electric cylinder assembly 20 thereto a variety of vehicle types, makes, and models 90.

The slide assemblies 30, 35 comprise a pair of mirror image units each comprising a rectangular non-rotating type being commercially available linear multi-element sliding units providing two (2) to four (4) progressive sliding sections, thereby providing a compact length when the apparatus 10 is in a retracted state. The first slide assembly 30 comprises a stationary first slide housing 31 further comprising two (2) first slide mounting brackets 33 and a first slide rod 32. The first slide mounting brackets 33 are envisioned being similar in construction and materials as the aforementioned cylinder mounting brackets 24, 26 enabling attachment of the first slide assembly 30 thereto the undercarriage area of the vehicle 90 in a similar manner as the electric cylinder assembly 20. The first slide rod 32 comprises a low-friction linear device having expected internal components such as ball bearings, bearing guides, a sealed lubrication system, and the like. The first slide rod 32 comprises a forward extending member of the first slide assembly 30 providing an attachment means thereto the pivot plate 50 thereat a front end portion (see FIGS. 3a and 3b). The second slide assembly 35 comprises a mirror image of the first slide assembly 30 being located in a parallel arrangement thereto and providing similar construction, materials, and functionality. Additionally, the second slide assembly 35 provides a threaded attachment means thereto a tilt rod bushing 42 affixed along an inner vertical surface.

The tilt rod bushing 42 comprises a commercially available ball joint device having an internal bronze or brass bushing so as to slidingly receive and guide the tilt rod 40 therethrough during retraction and deployment of the apparatus 10. Subsequent thereto the pivot plate 50 being projected forward via the primary horizontal motion 61 described above, the tilt rod 40 provides a secondary tilting motion 62 thereto the pivot plate 50, thereby positioning and displaying the license plate 80 in a normal manner (see FIGS. 3a and 3b). The tilt rod 40 comprises a round metal shape being one (1) to two (2) feet long having a threaded region along a rear portion thereof providing a threaded attachment thereto a tilt rod stop block 41. The tilt rod stop block 41 provides a threadingly adjustable means thereto the tilt rod 40 comprising a mechanical stop device located threadingly thereupon the tilt rod 40. The tilt rod stop block 41 further comprises a metal cylindrical element having a central threaded female aperture sized so as to receive the tilt rod portion 40 therethrough. The tilt rod stop block 41 also comprises a securing fastener 60 to hold said stop block 41 in a desired position thereupon the tilt rod 40. Upon extension of the apparatus 10, the tilt rod 40 in like manner is extended in a forward direction until the tilt rod stop block 41 contacts the tilt rod bushing 42, thereby halting forward movement of said tilt rod 40. A front portion of the tilt rod 40 provides an attachment means and a secondary tilting motion 62 thereto the pivot plate 50 (see FIGS. 3a and 3b).

Figure 3A:
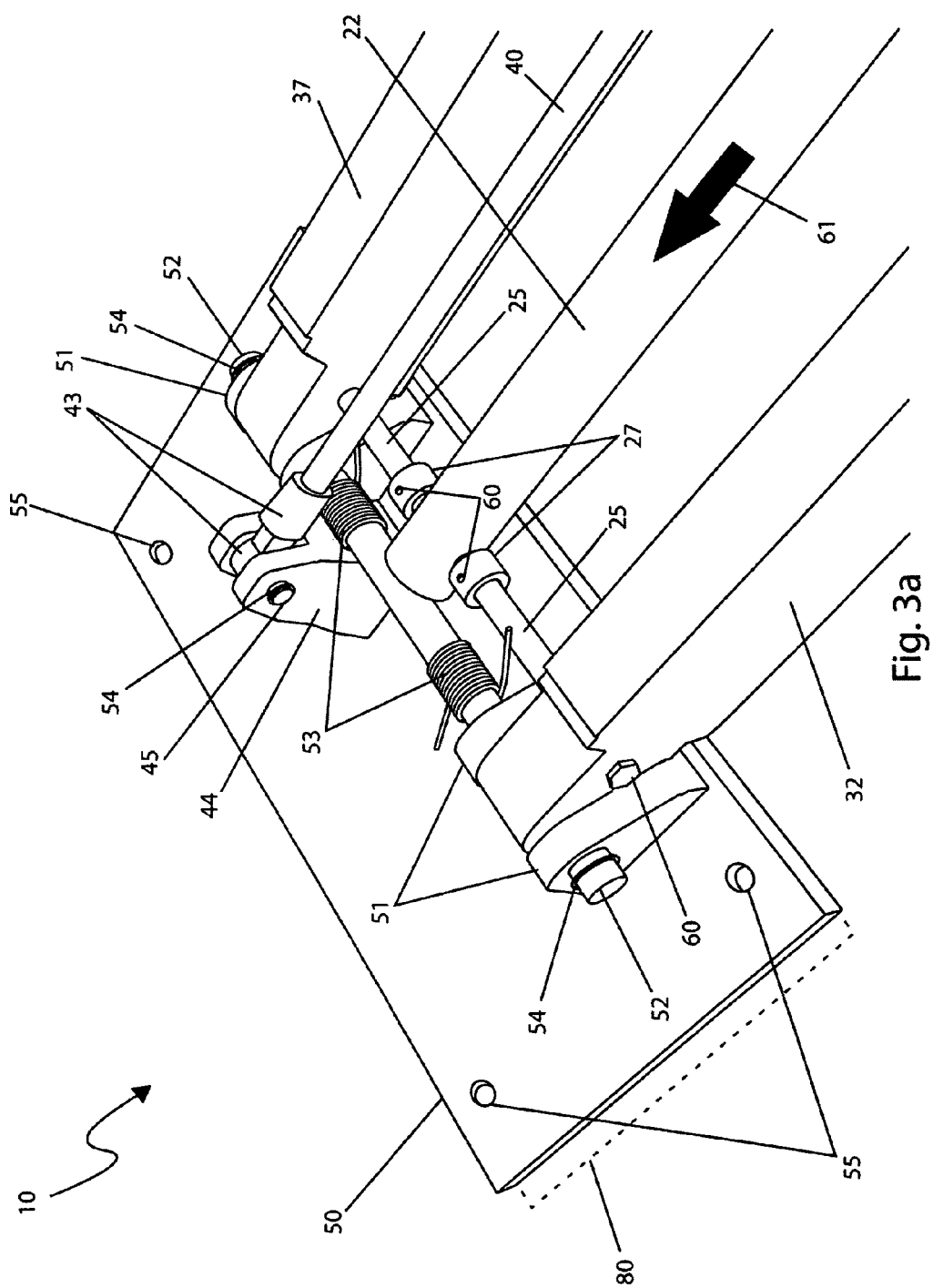
FIG. 3a is a close-up top view of a pivot plate portion 50 of the tag plate positioning bracket 10 depicting a horizontal state, according to a preferred embodiment of the present invention.

Referring now to FIG. 3a a close-up top view of a pivot plate portion 50 of the apparatus 10 depicting a horizontal state, according to a preferred embodiment of the present invention, is disclosed. The pivot plate portion 50 of the apparatus 10 is shown here in the horizontal position. The cylinder shaft 22 provides a primary horizontal motion 61 to project and retract the pivot plate 50. Transmission of the primary motion 61 thereto the pivot plate 50 is accomplished via a plurality of mechanical components comprising a cylinder shaft 22, a cylinder connecting rod 25, the first 32 and second 37 slide rods, and a pair of pivot plate brackets 51.

The cylinder shaft 22 comprises a drilled through-hole at a forward end portion which provides sliding attachment thereto a cylinder connecting rod 25 via insertion therethrough. The cylinder connecting rod 25 comprises a length of round bar stock extending horizontally and perpendicularly therefrom the cylinder shaft 22 forming a "T"-shaped assembly. The cylinder connecting rod 25 further comprises a pair of clamp collars 27 affixed thereto being adjacent thereto the cylinder shaft 22 and secured using common fasteners 60, thereby maintaining a relative position of the cylinder connecting rod 25 thereto the cylinder shaft 22. The opposing ends of the cylinder connecting rod 25 are permanently attached thereto the first 32 and second 37 slide rods being inserted therein bored holes located therein inner side surfaces of the rectangular slide rods 32, 37, and secured using common fasteners 60. The cylinder connecting rod 25 transmits a linear motion of the cylinder shaft 22 thereto the slide rods 32, 37 allowing the slide rods 32, 37 and said cylinder shaft 22 to move as a single assembly. The first 32 and second 37 slide rods provide a rotating attachment means thereto respective pivot plate brackets 51 along a forward portion thereof. Each pivot plate bracket 51 is envisioned to be made using common machining processes and comprise a slotted metal fixture with a central horizontal pivot plate rod 52 inserted therethrough. The pivot plate brackets 51 provide rotation of the pivot plate 50 in relation thereto the slide rods 32, 37 during the secondary tilting motion 62. Additionally, the pivot plate rod portion 52 provides an anchoring means thereto a pair of torsion springs 53. The torsion springs 53 are envisioned to be standard devices providing a downward force thereto a rear surface of the pivot plate 50, thereby stabilizing the pivot plate 50 in a horizontal position during normal motoring as well as during projection and retraction of the pivot plate 50. The pivot plate brackets 51 provide an attachment means thereto the pivot plate 50 using a plurality of common fasteners 60 in an expected manner.

Figure 3B:
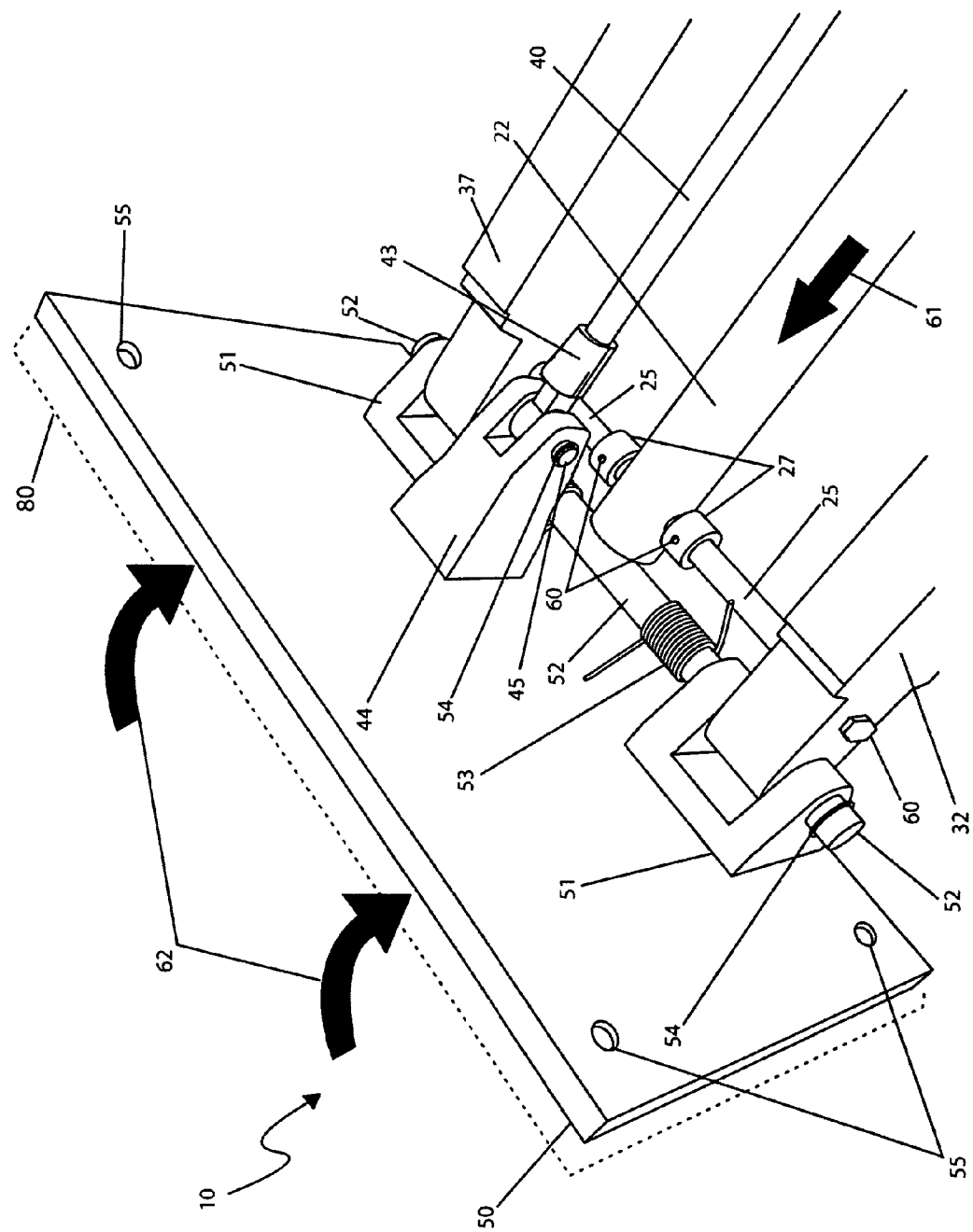
FIG. 3b is a close-up top view of a pivot plate portion 50 of the tag plate positioning bracket 10 depicting a fully deployed state, according to a preferred embodiment of the present invention.

Referring now to FIG. 3b, a close-up top view of a pivot plate portion 50 of the apparatus 10 depicting a fully deployed state, according to a preferred embodiment of the present invention, is disclosed. Transmission of the secondary tilting motion 62 thereto the pivot plate 50 is accomplished via a plurality of mechanical components comprising a tilt rod 40, a tilt rod joint 43, a tilt rod shaft 45, and a tilt rod bracket 44. The tilt rod 40 provides a secondary tilting motion 62 thereto the pivot plate 50, enabling rotating and tilting of an affixed license plate 80 thereto a normal display position.

Rotational attachment of the tilt rod 40 thereto the pivot plate 50 is accomplished via attachment thereto a tilt rod joint 43. The tilt rod joint 43 works in conjunction with a tilt rod shaft 45 and a tilt rod bracket 44 forming a horizontal axle-type assembly. The tilt rod shaft 45 and a tilt rod bracket 44 are envisioned being similar to the aforementioned pivot plate rod 52 and pivot plate bracket 51, respectively. The tilt rod bracket 44 provides an attachment means thereto the pivot plate 50 along a rear surface using common fasteners 60. The tilt rod joint 43 comprises a female threaded attachment and an integral rotating joint envisioned to be similar in construction and function thereto a standard tie-rod end.

During forward deployment of the apparatus 10, the tilt rod 40 reaches a mechanical limit as defined by the aforementioned tilt rod stop block 41. Contact between the tilt rod stop block 41 and the tilt rod bushing 42 results in the tilt rod 40 being in a state of static tension. Subsequent completion of the forward primary motion 61 then produces the secondary tilting motion 62 as the pivot plate 50 rotates upwardly rotating about the pivot plate rod 52 as illustrated here.

Figure 4A:
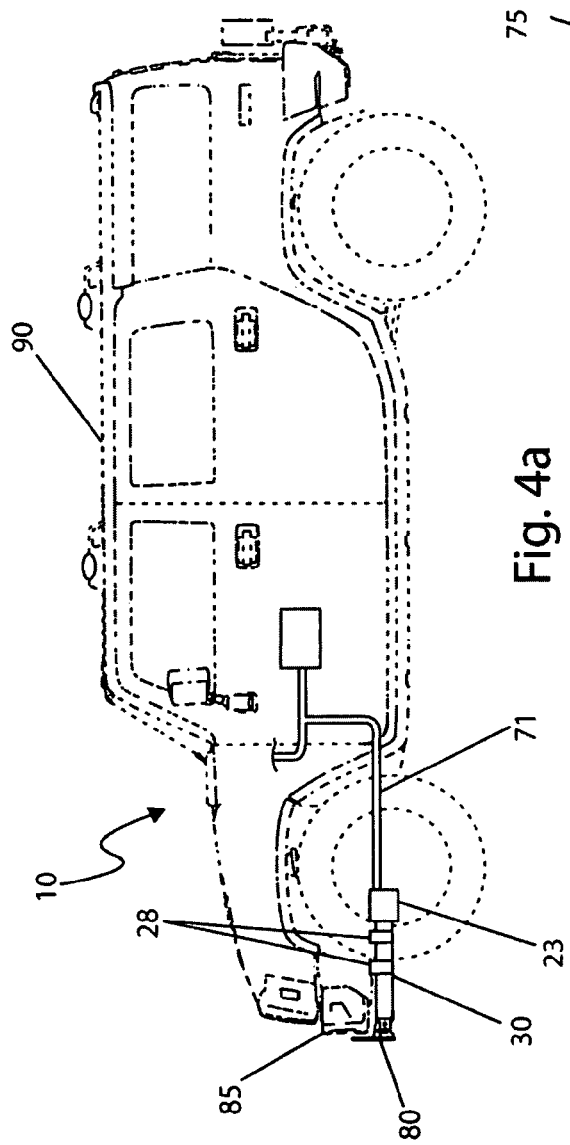
FIG. 4a is a side view of a tag plate positioning bracket 10 as installed therein a vehicle 90 depicting an electrical control system, according to a preferred embodiment of the present invention.
Figure 4B:
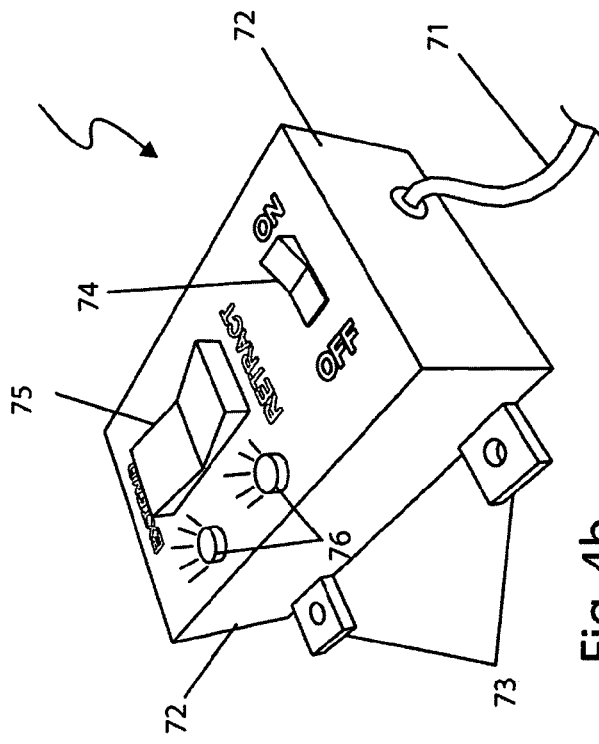
FIG. 4b is a close-up view of a control box assembly portion 70 of a tag plate positioning bracket 10, according to a preferred embodiment of the present invention; and, FIG. 5 is an electrical block diagram of a tag plate positioning bracket 10, according to a preferred embodiment of the present invention.

Referring now to FIGS. 4a and 4b, side and close-up views of an electrical control system portion of a tag plate positioning bracket 10, according to a preferred embodiment of the present invention, is disclosed. The apparatus 10 comprises a pair of position sensors 28, a control box assembly 70, and a control cable 71. The electrical control system described herein provides a user with automatic control of projection and retraction functions of the apparatus 10 at the touch of a button 75. Additionally, visual indicator lights 76 provide information to the user inside the vehicle 90. The aforementioned electric cylinder assembly 20 further comprises a pair of position sensors 28 providing input signals thereto the control box assembly 70, thereby detecting a position of the apparatus when in either a projected or retracted state. The position sensors 28 are preferably common adjustable externally mounted magnetic devices common in the industry; however, various types of sensors and switches may be provided such as reed switches, capacitive sensors, microswitches, or the like, without deviating from the concept and as such should not be interpreted as a limiting factor of the apparatus 10. The sensors 28 are in electrical communication therewith a control box assembly 70 via a control cable 71. The control cable 70 comprises a plurality of bundled copper conductors providing expected functions thereto the apparatus 10 such as connection thereto the vehicle's 12-volt electrical system, distribution of said 12-volt power to all components of the apparatus 10, conduction of sensor signals, and the like.

The control box assembly 70 further comprises a housing 72, an ON/OFF switch 74, a motor switch 75, and a pair of indicator lights 76. The control box assembly 70 is envisioned to be conveniently located therewithin a passenger compartment portion of the vehicle 90. The housing 72 comprises a durable injection-molded rectangular plastic enclosure providing protection to internal electrical and electronic components such as, but not limited to: circuit boards, relays, embedded software, microprocessors, and the like. The housing 72 further comprises a plurality of mounting brackets 73 being preferably integrally molded therein the housing 72. The mounting brackets 73 are located along the four (4) lower corner portions of the housing 72 providing a customizable mounting means thereto the apparatus 10 upon suitable surfaces within the vehicle 90 such as a console, a dashboard, or the like using common fasteners 60. The ON/OFF switch 74 comprises a standard two-position rocker-type switch providing control of a 12-volt DC current thereto the apparatus 10. The motor switch 75 comprises a three-position rocker-type switch with a center spring return feature providing a momentary contact means to initiate the projection and retraction functions of the apparatus 10. Additionally, a pair of indicator lights 76 located adjacent thereto the motor switch 75 which provide indication thereto a user when the apparatus 10 is in the extended or retracted position.

It is envisioned that the ON/OFF switch 74 and motor switch 75 may be introduced comprising a variety of switching types and styles such as slide switches, toggle switches, pressure activated buttons, or the like with equal benefit. Furthermore, said switches 74, 75 are envisioned to provide an integral illuminating means for night-time operation being common in the industry. Finally, it is understood that the apparatus 10 may be provided having any number of additional and optional electronic functions such as, but not limited to: variable speed functions, one-touch operation, additional sensors/indicator lights, and the like, based upon user preferences.

Figure 5:
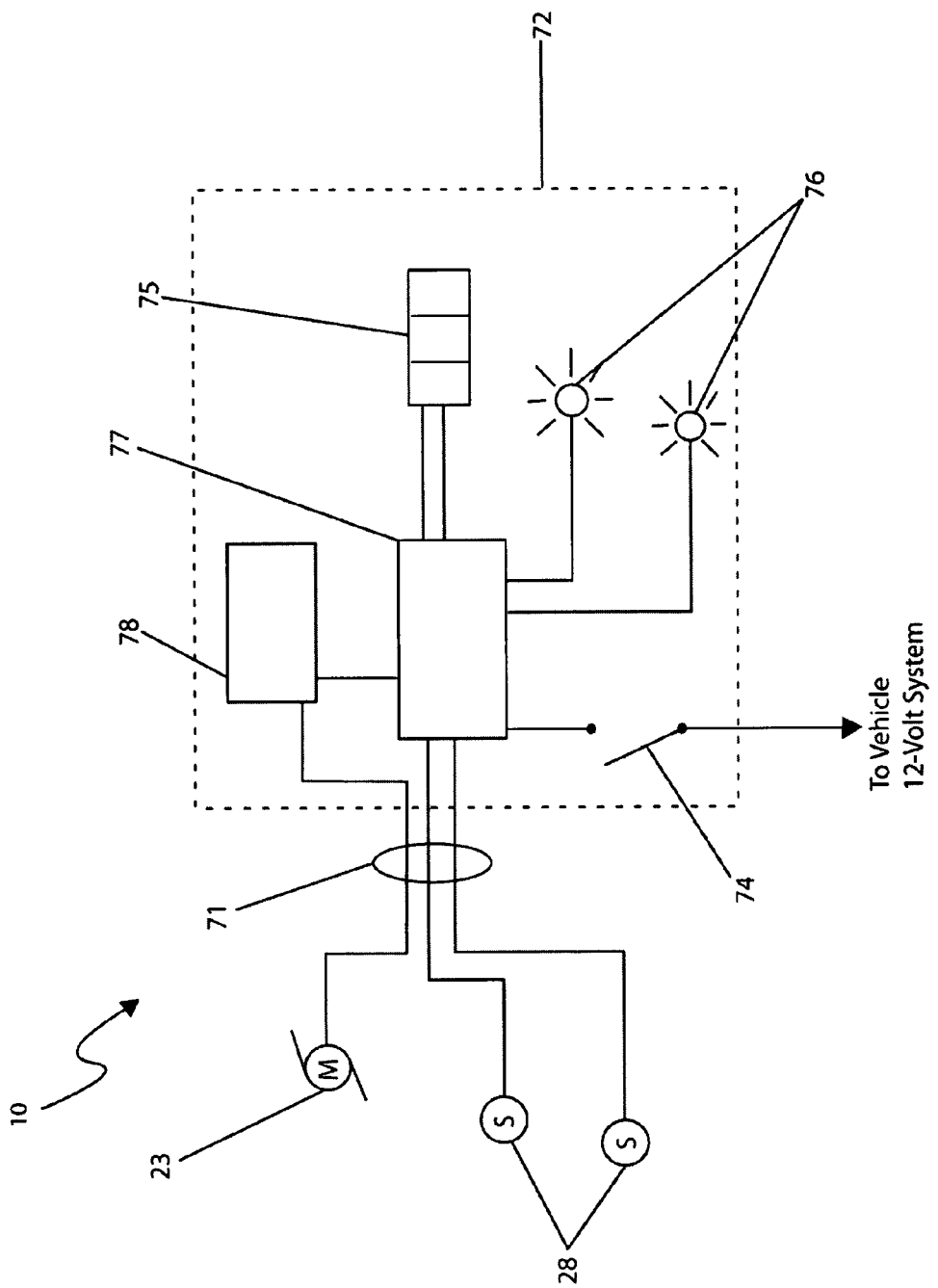

Referring now to FIG. 5, an electrical block diagram of a tag plate positioning bracket 10, according to a preferred embodiment of the present invention, is disclosed. The apparatus 10 comprises a control cable 71 which is in electrical communication therewith an existing 12-volt system within the vehicle 90 via the control cable 71 using common connectors, terminals, and the like. The control cable 71 conducts said 12-volt DC power thereto the control box assembly 70 comprising an ON/OFF switch 74 providing control of said DC power thereto an internal control circuit board 77. The ON/OFF switch comprises a common panel-mount single-pole single-throw switch. Electrical power then passes to the control circuit board 77 which comprises necessary printed circuit board level components and software capable of receiving input signal voltages therefrom the position sensors 28 and the motor switch 75. The motor switch 75 comprises a standard single-pole double-throw toggle-type rocker switch unit. The control circuit board 77 provides a low-voltage output thereto a pair of illuminating indicator lights 76, thereby communicating to a user a projected or retracted state of the apparatus 10 based upon received position sensor 28 input signals. Upon receiving an "extend" or "retract" command signal therefrom the motor switch 75, the control circuit board 77 processes said input signal and provides multiple signal voltages thereto a relay board 78 which in-turn conducts a high-current output thereto the electric cylinder motor 23, thereby initiating the apparatus 10 to perform particular motions 61, 62 required to display or conceal the vehicle's 90 license plate 80 as desired.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is recommended that installation of the apparatus 10 therein a vehicle 90 should be performed by a trained automotive electrician. After initial purchase or acquisition of the apparatus 10, it would be installed as indicated in FIGS. 1 and 4a.

The method of installing and utilizing the apparatus 10 may be achieved by performing the following steps: procuring a particular model of the apparatus 10 for installation therein an anticipated vehicle 90; pre-assembling the electric cylinder assembly 20 and slide assemblies 30, 35 thereto the pivot plate 50, if needed; removing any existing license plate 80 mounting equipment therefrom the vehicle 90; elevating a vehicle 90 to a convenient working height providing access thereto an undercarriage area 90; locating appropriate mounting surfaces along an undercarriage of the vehicle 90; determining a correct position of the apparatus 10 which produces a desired resulting license plate 80 position; attaching the rear 24 and front 26 cylinder mounting brackets thereto the vehicle's undercarriage 90 using supplied fasteners 60; mounting the slide mounting brackets 33, 38 using the supplied fasteners 60; mounting the control box assembly 70 in a convenient location therein a passenger compartment area of the vehicle 90; routing the control cable 71 as required between the undercarriage portion of the apparatus 10 and the control box assembly portion 70; making electrical connections to an existing vehicle 12-volt electrical system as required; supplying electrical power thereto the apparatus 10 by pressing the ON/OFF switch 74 to an "ON" position; initiating commands thereto the control box assembly 70 by pressing the motor switch 75; executing an "extend" command by pressing the corresponding "extend" button portion of the motor switch 75; initiating a "retract" command by pressing the corresponding "retract" button in like manner; observing the indicator lights 76 to verify an anticipated position of the apparatus 10; adjusting a position of the tilt rod stop block 41 to produce an acceptable license plate 80 position when fully extended forward; pressing the ON/OFF switch 74 to an "OFF" position to disable the apparatus 10 until needed again; and, enjoying the convenient manner with which a user may conceal a vehicle license plate 80 during such events as a car show using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A tag plate positioning bracket for a motor vehicle, comprising:

a pivot plate providing a mounting surface for a license plate, further comprising a plurality of license plate mounting holes;

an electric cylinder assembly providing a powered linear horizontal motion thereto said pivot plate, thereby allowing said pivot plate to retract therealong an undercarriage of said motor vehicle;

a cylinder shaft providing a horizontal motion to project and retract said pivot plate via a cylinder connecting rod, further comprising a first end, a second end opposite said first end, a first slide rod, a second slide rod, a first pivot plate bracket, and a second pivot plate bracket;

said cylinder connecting rod slidingly attached to said cylinder shaft and extending horizontally and perpendicularly therefrom said cylinder shaft;

said first end of said cylinder connecting rod attached thereto said first slide rod;

said second end of said cylinder connecting rod attached thereto said second slide rod;

said first slide rod providing a rotating attachment means thereto said first pivot plate bracket;

said second slide rod providing a rotating attachment means thereto said second pivot plate bracket;

a pivot plate rod portion providing an anchoring means thereto a first torsion spring and a second torsion spring, said pivot plate rod portion runs therethrough said first pivot plate bracket and said second pivot plate bracket, such that said first torsion spring and said second torsion spring are located in between said first pivot plate bracket and said second pivot plate bracket;

a first slide assembly located parallel to said electric cylinder assembly on a first side;

a second slide assembly located parallel to said electric cylinder assembly on a second side opposite said first side;

a tilt rod providing a secondary tilting motion thereto said pivot plate, thereby positioning and displaying said license plate in a usual manner;

a tilt rod bushing slidingly receiving and guiding said tilt rod during retraction and deployment of said bracket; and, an electrical control system thereby providing a user with automatic control of projection and retraction functions of said bracket by use of a motor switch;

wherein said cylinder connecting rod transmits a linear motion of said cylinder shaft thereto said first slide rod and said second slide rod, thereby allowing said first slide rod and said second slide rod and said cylinder shaft to move as a single assembly;

wherein said first slide assembly and said second slide assembly provide two (2) to four (4) progressive sliding sections, thereby providing a compact length when said bracket is in a retracted state;

wherein said bracket is attached to said undercarriage of said motor vehicle;

wherein said bracket provides a retractable mechanism that allows said license plate to move to a fully deployed state and a horizontal state;

wherein said first pivot plate bracket and said second pivot plate bracket provide rotation of said pivot plate in relation to said first slide rod and said second slide rod during a tilting motion of said pivot plate during change from said horizontal state thereto said fully deployed state;

wherein said first torsion spring and said second torsion spring provide a downward force thereto a rear surface of said pivot plate, thereby stabilizing said pivot plate during normal operation of said motor vehicle as well as during projection and retraction of said pivot plate;

wherein said pivot plate can be moved into said fully deployed state, thereby allowing said license plate to be displayed in a usual manner; and, wherein said pivot plate can be moved into said horizontal state, thereby allowing said license plate to fold down under said undercarriage of said motor vehicle as needed.

2. The bracket of claim 1, wherein said electric cylinder assembly further comprises:

a cylinder housing providing a protective sealed metal enclosure thereto internal components of said electric cylinder assembly;

a DC cylinder motor operably connected to said cylinder shaft providing a horizontal motion to project and retract said pivot plate;

an integral gear reducer located therein said cylinder housing;

a plurality of electrical connectors located therein said cylinder housing;

a first rear cylinder mounting bracket connected to an edge of said motor;

a second rear cylinder mounting bracket connected to an opposite edge of said motor;

a first front cylinder mounting bracket connected to an edge of said cylinder housing; and, a second front cylinder mounting bracket connected to an opposite edge of said cylinder housing;

wherein said first rear cylinder mounting bracket and said second rear cylinder mounting bracket provide an attachment means for said electric cylinder assembly thereto said undercarriage of said motor vehicle;

wherein said electric cylinder assembly provides a retracting and concealing means thereto said license plate by relocating said license plate to a position under said motor vehicle; and, wherein said first front cylinder mounting bracket and said second front cylinder mounting bracket provide an attachment means for said electric cylinder assembly thereto said undercarriage of said motor vehicle.

3. The bracket of claim 1, wherein said first slide assembly further comprises:

a first slide housing providing a protective sealed metal enclosure thereto internal components of said first slide assembly;

a first end first slide mounting bracket located at a first end of said first slide housing;

a second end first slide mounting bracket located on a second end of said first slide housing; and, said first slide rod operably connected thereto said first slide housing comprising a forward extending member of said first slide assembly and providing an attachment means thereto said pivot plate thereat a front end portion;

wherein said first end first slide mounting bracket and said second end first slide mounting bracket provide an attachment means for said first slide assembly thereto said undercarriage of said motor vehicle; and, wherein said first slide assembly provides said progressive sliding sections, thereby providing said compact length when said apparatus is in said retracted state.

4. The bracket of claim 1, wherein said second slide assembly further comprises:

a second slide housing providing a protective sealed metal enclosure thereto internal components of said second slide assembly;

a first end second slide mounting bracket located at a first end of said second slide housing;

a second end second slide mounting bracket located on a second end of said second slide housing; and, said second slide rod operably connected thereto said second slide housing comprising a forward extending member of said second slide assembly and providing an attachment means thereto said pivot plate thereat a front end portion;

wherein said first end second slide mounting bracket and said second end second slide mounting bracket provide an attachment means for said second slide assembly thereto said undercarriage of said motor vehicle;

wherein said second slide assembly provides a threaded attachment means thereto said tilt rod bushing affixed along an inner vertical surface; and, wherein said second slide assembly provide said progressive sliding sections, thereby providing said compact length when said apparatus is in said retracted state.

5. The bracket of claim 1, wherein said tilt rod further comprises:

a round metal shape one (1) to two (2) feet long having a threaded region along a rear portion thereof, thereby providing a threaded attachment thereto a tilt rod stop block;

said tilt rod stop block comprises a mechanical stop device thereto said tilt rod;

a front portion of said tilt rod attached thereto said pivot plate;

a tilt rod joint providing a rotational attachment of said tilt rod thereto said pivot plate; and, a tilt rod shaft and a tilt rod bracket that works in conjunction with said tilt rod joint, thereby forming a horizontal axle-type assembly;

wherein upon extension of said bracket said tilt rod extends in a forward direction until said tilt rod stop block contacts said tilt rod bushing, thereby halting movement of said tilt rod.

6. The bracket of claim 5, wherein said tilt rod bushing further comprises a ball-joint device having an internal bronze or brass bushing.

7. The bracket of claim 1, wherein said cylinder connecting rod is secured therewith said cylinder shaft by a first clamp collar and a second clamp collar, thereby maintaining a relative position of said cylinder connecting rod thereto said cylinder shaft.

8. The bracket of claim 1, wherein said electrical control system further comprises:

a first position sensor located thereon said electric cylinder assembly, thereby providing a first input signal thereto a control box assembly;

a second position sensor located thereon said electric cylinder assembly, thereby providing a second input signal thereto said control box assembly; and, said control box assembly in electrical communication therewith said first position sensor and said second position sensor therethrough a control cable;

wherein said first position sensor and said second position sensor detect and relay a position of said apparatus; and, wherein said electrical control system provides a user with automatic control of projection and retraction functions of said apparatus.

9. The bracket of claim 8, wherein said control box assembly further comprises:

a housing providing protection to internal components of said control box assembly;

a plurality of mounting brackets located along each lower corner portion of said housing, thereby providing a mounting means thereto a suitable interior surface of said motor vehicle;

a motor switch providing a contact means to initiate said retraction and said projection functions of said apparatus;

an on/off switch providing current thereto said apparatus; and, a first visual indicator light and a second visual indicator light each located adjacent thereto said motor switch, thereby providing indication thereto said user when said apparatus is in said extended or said retracted position;

wherein said control box assembly is located therewithin a passenger compartment of said motor vehicle.

10. The bracket of claim 1, wherein said bracket may be configured to fit a variety of vehicle types such as sport cars, show cars, new cars, vintage cars, and trucks in a manner providing equal benefit thereto.

11. A method for using a tag plate positioning bracket for a motor vehicle, said method comprising the steps of:

providing said bracket, comprising:

a pivot plate providing a mounting surface for a license plate, further comprising a plurality of license plate mounting holes;

an electric cylinder assembly providing a powered linear horizontal motion thereto said pivot plate, thereby allowing said pivot plate to retract therealong an undercarriage of said motor vehicle;

a cylinder shaft providing a horizontal motion to project and retract said pivot plate via a cylinder connecting rod, further comprising a first end, a second end opposite said first end, a first slide rod, a second slide rod, a first pivot plate bracket, and a second pivot plate bracket;

said cylinder connecting rod slidingly attached to said cylinder shaft and extending horizontally and perpendicularly therefrom said cylinder shaft;

said first end of said cylinder connecting rod attached thereto said first slide rod;

said second end of said cylinder connecting rod attached thereto said second slide rod;

said first slide rod providing a rotating attachment means thereto said first pivot plate bracket;

said second slide rod providing a rotating attachment means thereto said second pivot plate bracket;

a pivot plate rod portion providing an anchoring means thereto a first torsion spring and a second torsion spring, said pivot plate rod portion runs therethrough said first pivot plate bracket and said second pivot plate bracket, such that said first torsion spring and said second torsion spring are located in between said first pivot plate bracket and said second pivot plate bracket;

a first slide assembly located parallel to said electric cylinder assembly on a first side;

a second slide assembly located parallel to said electric cylinder assembly on a second side opposite said first side;

a tilt rod providing a secondary tilting motion thereto said pivot plate, thereby positioning and displaying said license plate in a usual manner;

a tilt rod bushing slidingly receiving and guiding said tilt rod during retraction and deployment of said bracket; and, an electrical control system thereby providing a user with automatic control of projection and retraction functions of said bracket by use of a motor switch;

wherein said cylinder connecting rod transmits a linear motion of said cylinder shaft thereto said first slide rod and said second slide rod, thereby allowing said first slide rod and said second slide rod and said cylinder shaft to move as a single assembly;

wherein said first slide assembly and said second slide assembly provide two (2) to four (4) progressive sliding sections, thereby providing a compact length when said bracket is in a retracted state;

wherein said bracket is attached to said undercarriage of said motor vehicle;

wherein said bracket provides a retractable mechanism that allows said license plate to move to a fully deployed state and a horizontal state;

wherein said first pivot plate bracket and said second pivot plate bracket provide rotation of said pivot plate in relation to said first slide rod and said second slide rod during a tilting motion of said pivot plate during change from said horizontal state thereto said fully deployed state;

wherein said first torsion spring and said second torsion spring provide a downward force thereto a rear surface of said pivot plate, thereby stabilizing said pivot plate during normal operation of said motor vehicle as well as during projection and retraction of said pivot plate;

wherein said pivot plate can be moved into said fully deployed state, thereby allowing said license plate to be displayed in a usual manner; and, wherein said pivot plate can be moved into said horizontal state, thereby allowing said license plate to fold down under said undercarriage of said motor vehicle as needed;

procuring a particular model of said bracket for installation therein said motor vehicle;

pre-assembling said electric cylinder assembly, said first slide assembly, and said second slide assembly thereto said pivot plate, if needed;

removing any existing license plate mounting equipment therefrom said motor vehicle;

elevating said motor vehicle to a convenient working height providing access thereto said undercarriage of said motor vehicle;

locating appropriate mounting surfaces along said undercarriage of said motor vehicle;

determining a correct position of said bracket which produces a desired resulting license plate position;

attaching a rear and a front cylinder mounting brackets thereto said motor vehicle's undercarriage using supplied fasteners;

mounting a slide mounting bracket using said supplied fasteners;

mounting a control box assembly in a convenient location therein a passenger compartment area of the vehicle;

routing a control cable as required between said undercarriage of said motor vehicle and said bracket and a control box assembly portion;

making electrical connections to an existing vehicle 12-volt electrical system as required;

supplying electrical power thereto said bracket by pressing an ON/OFF switch to an "ON" position;

initiating commands thereto said control box assembly by pressing said motor switch;

executing an "extend" command by pressing a corresponding "extend" button portion of said motor switch;

initiating a "retract" command by pressing a corresponding "retract" button in like manner;

observing a first visual indicator light and a second visual indicator light to verify an anticipated position of said bracket;

adjusting a position of a tilt rod stop block to produce an acceptable license plate position when fully extended forward; and, pressing said ON/OFF switch to an "OFF" position to disable said bracket until needed again.

* * * * *